United States Patent
Macbeth

(10) Patent No.: US 6,674,289 B2
(45) Date of Patent: Jan. 6, 2004

(54) CIRCUIT PROTECTION DEVICE WITH HALF CYCLE SELF TEST

(75) Inventor: Bruce F. Macbeth, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 398 days.

(21) Appl. No.: 09/725,525

(22) Filed: Nov. 29, 2000

(65) Prior Publication Data

US 2001/0033468 A1 Oct. 25, 2001

Related U.S. Application Data

(60) Provisional application No. 60/183,273, filed on Feb. 17, 2000.

(51) Int. Cl.[7] .................. G01R 31/14; G01R 31/08; G01R 31/02; H02H 3/16
(52) U.S. Cl. .................. 324/509; 324/424; 324/524; 324/527; 361/45
(58) Field of Search .................. 324/509, 523, 324/525, 524, 424, 527, 423; 361/5, 45, 42, 115

(56) References Cited

U.S. PATENT DOCUMENTS

| | | | | |
|---|---|---|---|---|
| 4,685,024 A | * | 8/1987 | Martellock et al. | 361/93.6 |
| 4,816,957 A | * | 3/1989 | Irwin | 361/45 |
| 5,600,524 A | * | 2/1997 | Neiger et al. | 361/42 |
| 5,638,243 A | | 6/1997 | Torezan et al. | |
| 5,715,125 A | | 2/1998 | Neiger et al. | |
| 5,834,940 A | * | 11/1998 | Brooks et al. | 324/424 |
| 6,040,967 A | | 3/2000 | DiSalvo | |
| 6,191,589 B1 | * | 2/2001 | Clunn | 324/424 |
| 6,262,871 B1 | * | 7/2001 | Nemir et al. | 324/424 |
| 6,421,214 B1 | * | 7/2002 | Packard et al. | 361/7 |

* cited by examiner

Primary Examiner—Anjan K. Deb
(74) Attorney, Agent, or Firm—Wall Marjama & Bilinski LLP

(57) ABSTRACT

A circuit protection device connected between two lines of an AC power source self checks for an introduced simulated ground fault every half cycle during a period when a trip SCR cannot conduct. If the self check fails, the device is tripped on the next half cycle of different phase. Possible responses to the self check failure include lighting an indicator lamp and locking out the device reset mechanism.

29 Claims, 7 Drawing Sheets

CIRCUIT PROTECTION DEVICE WITH HALF CYCLE SELF TEST

CROSS-REFERENCE TO RELATED APPLICATIONS

This application claims priority from U.S. Provisional Application Ser. No. 60/183,273 filed on Feb. 17, 2000, incorporated herein by reference.

FIELD OF THE INVENTION

This invention relates to the field of circuit protection devices, and in particular, to a circuit protection device which self checks for ground fault detection every half cycle.

BACKGROUND OF THE INVENTION

Ground fault circuit interrupters (GFCI) for interrupting the flow of electrical power to a device upon the occurrence of a ground fault have been known for many years. Known devices are usually effective in detecting ground faults associated with damaged insulation on the line conductor that could lead to fire, or to current accidentally flowing through a human body that could cause electrocution. In general, a GFCI senses and/or responds to a condition in a line carrying electrical current which indicates a presently or imminently dangerous condition, such as the presence of a current path other than the intended path of normal operation. Response to the sensed dangerous condition may be in the form of alarm actuation and/or opening the line (interrupting the circuit) between the source of power and the load.

Heretofore, GFCI's have been designed to self test in the event of a failure of the device to provide the intended protection. Among these are U.S. Pat. No. 5,600,524 (Neiger) that includes a timer that initiates a periodic self test of the GFCI, or that initiates a periodic alarm to alert the user to manually push the test button on the GFCI, utilizing circuitry that adds cost and that takes up space within the confines of a duplex receptacle embodiment. Another type of self test is disclosed in U.S. Pat. No. 5,638,243 (Torezan) which makes use of a visual indicator to display if hot and neutral power source conductors are inadvertently miswired to the load terminals of the GFCI, such that GFCI protection is lost at the duplex receptacles on the face of the GFCI. However, self-test of the electrical circuit is not disclosed. In addition, the self-test method does not disclose lock-out of load side power by the GFCI's interrupting contacts and the user is obliged to correctly interpret and take action based on appearance of the visual indicator. Similarly, U.S. Pat. No. 5,715,125 (Neiger) addresses self-testing of the relay solenoid which serves to open the GFCI interrupting contacts, but does not disclose self-test of the electrical circuit. Yet another type of self test is disclosed in U.S. Pat. No. 6,040,967 (DiSalvo), wherein the failure of certain components such as the SCR results in locking out power to the load.

However, other types of failures such as those involving the GFCI sensing circuitry require pushing the test button to initiate lock-out. In response, the GFCI trips out, after which the user resets the GFCI. Although regular testing is encouraged, in reality, few users test their GFCI's on a regular basis. Therefore, there is a need for a GFCI with a self-test feature.

SUMMARY OF THE INVENTION

Briefly stated, a circuit protection device connected between two lines of an AC power source self checks for an introduced simulated ground fault every half cycle during a period when a trip SCR cannot conduct. If the self check fails, the device is tripped on the next half cycle of different phase. Possible responses to the self check failure include lighting an indicator lamp and locking out the device reset mechanism.

According to an embodiment of the invention, a protection device connected between two lines of an AC power line includes means for introducing a simulated ground fault current between the two lines during a first polarity of the AC power; detection means for detecting the introduced ground fault during the first polarity of the AC power; and response means, responsive to the detection means, for responding to an absence of detection of the introduced ground fault.

According to an embodiment of the invention, a self testing protection device connected between two lines of an AC power source includes a resonant tank; a ground fault sensor; a rectified ground fault sensor bypass current sourced from a first polarity of the AC power source and used to energize the ground fault sensor; a first detector activated by the ground fault sensor, wherein the activated first detector causes the resonant tank to resonate, thereby indicating that all ground fault detection components in the device are operational; and a second detector, wherein the second detector responds to an absence of resonation in the resonant tank.

According to an embodiment of the invention, a method for self-testing a protection device connected between two lines of an AC power line includes the steps of (a) introducing a simulated ground fault between the two lines during a first polarity half cycle of the AC power; (b) detecting the introduced simulated ground fault during the first polarity half cycle; and (c) responding to an absence of detecting the introduced simulated ground fault.

DETAILED DESCRIPTION OF THE PREFERRED EMBODIMENT

Figure 1:
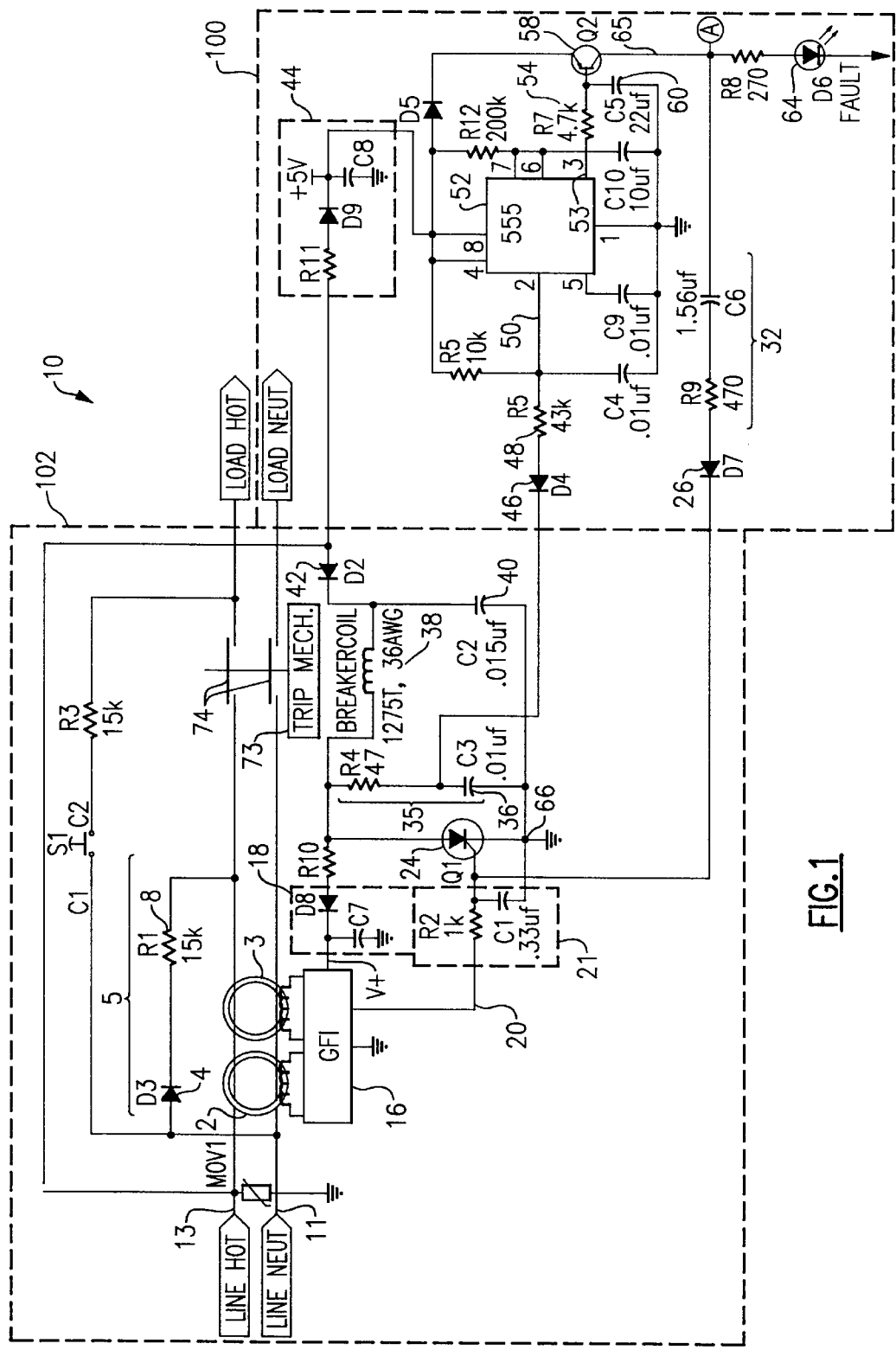
FIG. 1 shows a GFCI circuit according to an embodiment of the present invention.

Referring to FIG. 1, an embodiment of the invention illustrates a GFCI 10 which self checks for ground fault detection every negative half cycle during the period when an electronic switch such as an SCR 24 cannot conduct. If the self test fails, GFCI 10 is tripped out on the subsequent positive half cycle. GFCI 10 includes a GFI circuit 102 and a self test checking circuit 100. GFI circuit 102 includes a standard GFCI device in which a load-side ground fault is sensed by a differential transformer 2. A transformer 3, which is a grounded neutral transmitter, is used to sense grounded neutral faults. The transformer 2 output is processed by a GFI detector circuit 16 which produces a signal on output 20 that, after filtering in a circuit 21, activates a trip SCR 24. When SCR 24 turns ON, it activates a solenoid 38 which in turn operates a mouse trap device 73, releasing a plurality of contacts 74 and interrupting the load.

A power supply 18 provides power for GFI detector circuit 16 for full cycle operation. A negative cycle bypass circuit 5, which preferably includes a diode 4 in series with a resistor 8, introduces a bypass current, simulating a ground fault, between neutral and hot lines 11, 13 during the negative half cycle of the AC power. The same bypass current could also be produced by placing bypass circuit 5 between lines 11 and 13 with the diode 4 anode at neutral line 11.

A capacitor 40 is placed across a series string consisting of solenoid 38 and the parallel combination of SCR 24 and a snubber circuit 35. Capacitor 40 charges on the positive half cycle of the AC power, but is prevented from discharging on the negative half cycle of the AC power by a blocking diode 42.

Figure 2:
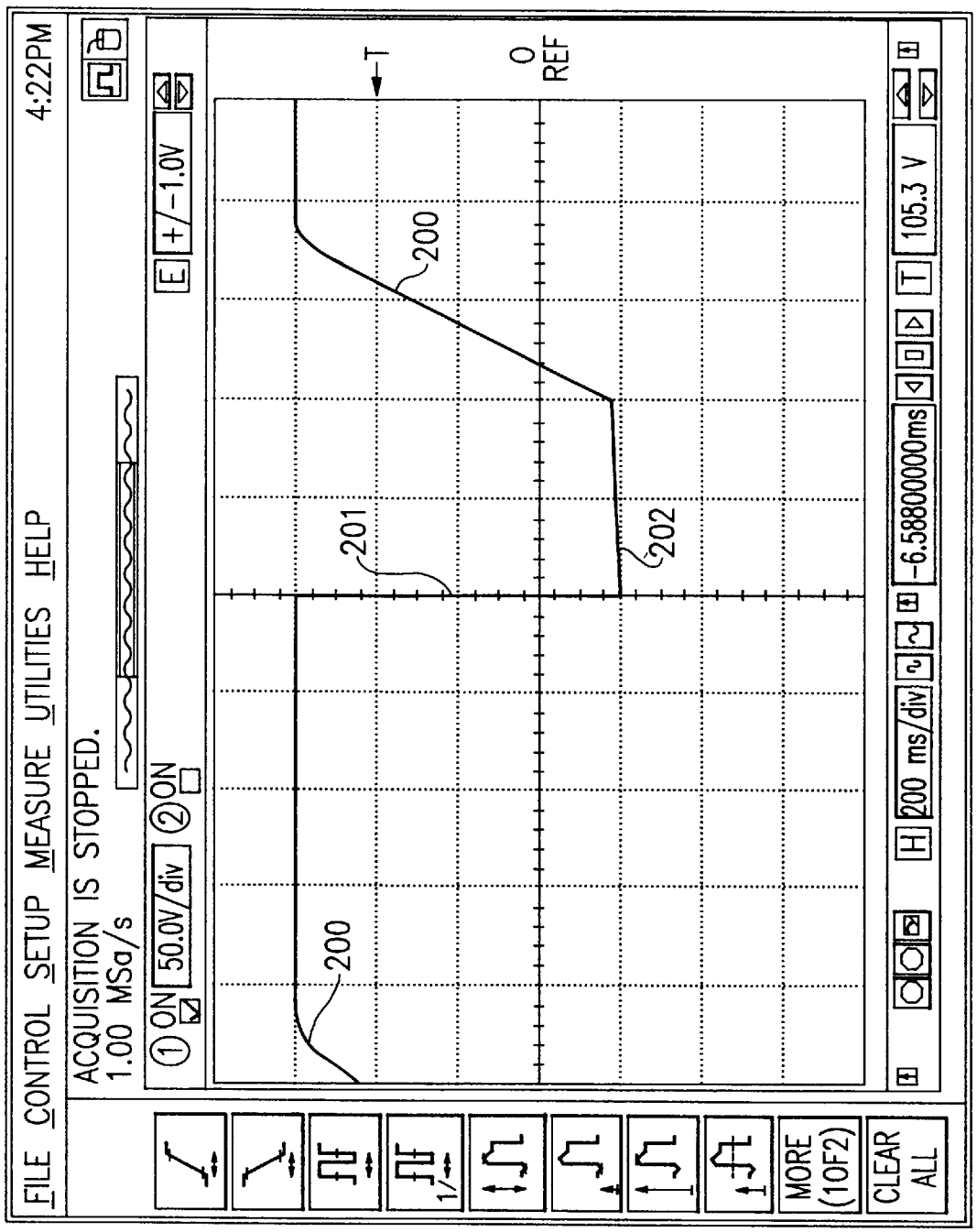
FIG. 2 shows a voltage waveform across a snubber circuit used in an embodiment of the present invention.
Figure 3:
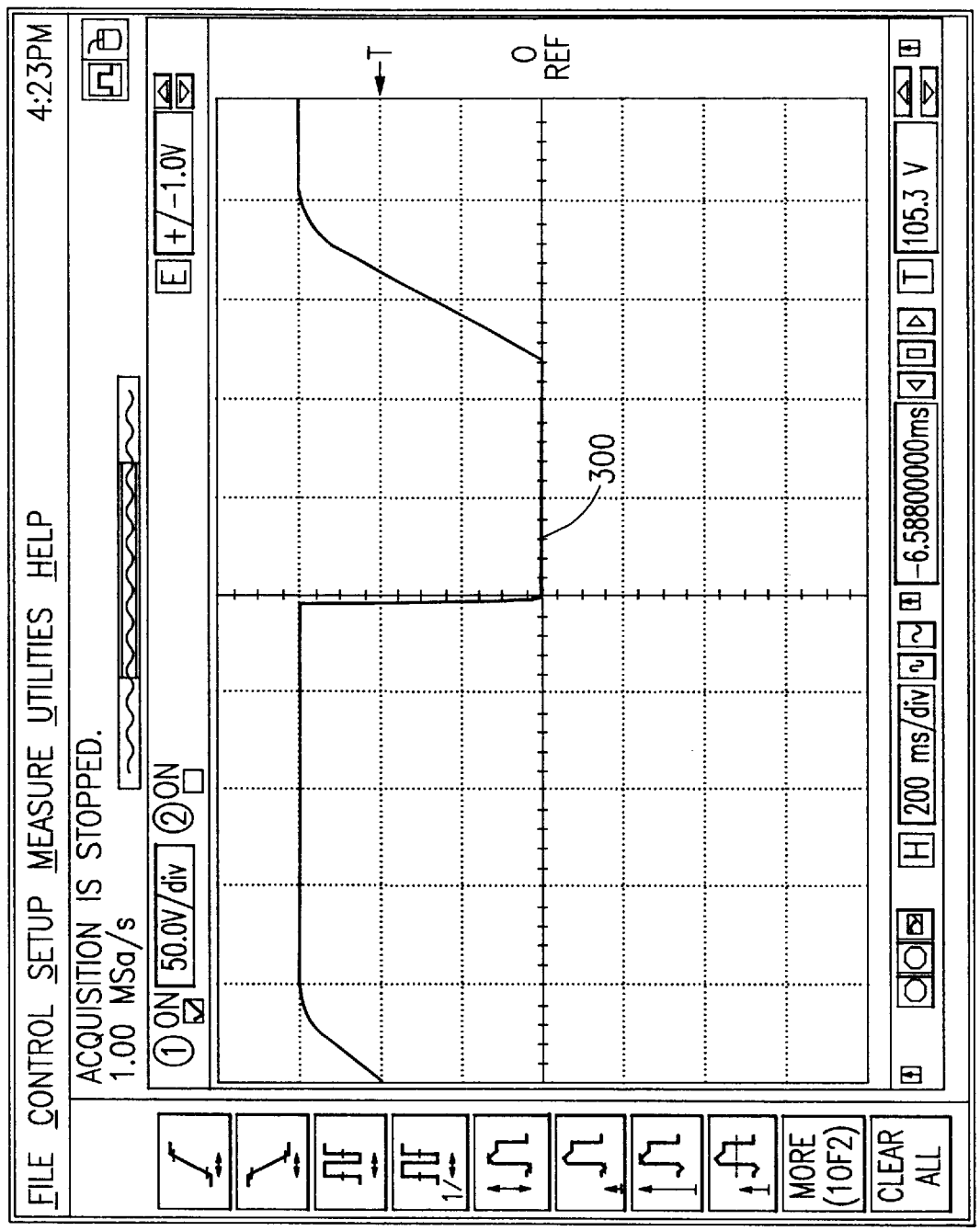
FIG. 3 shows a voltage waveform across the snubber circuit when a solenoid is shorted.

Referring also to FIGS. 2–3, capacitor 40 is charged to the peak of the AC wave as shown at point 200. On each negative portion of the AC wave, when SCR 24 cannot conduct line current, bypass 5 introduces a simulated ground fault which is sensed by transformers 2 and detected by GFI detector circuit 16, thereby activating SCR 24. Activation of SCR 24 discharges capacitor 40 through solenoid 38 and SCR 24 as shown at point 201. Capacitor 40 and solenoid 38 form a resonant circuit. When SCR 24 discharges capacitor 40 during the negative AC power cycle, a field is built up around solenoid 38 which, when collapsing, causes a recharge of capacitor 40 in the opposite direction, thereby producing a negative voltage across the capacitor when referenced to circuit common. When the SCR current falls below the minimum holding current, SCR 24 switches OFF, so that the negative charge remains on capacitor 40 until the next positive AC cycle. At that time, current passing through diode 42 charges capacitor 40 in the positive voltage direction.

The negative voltage across capacitor 40 also appears across capacitor 36 of snubber circuit 35 as shown at point 202. The negative voltage across capacitor 40 does not appear if solenoid 38 is shorted as shown at point 300 of FIG. 3, because no solenoid magnetic field exists to collapse and produce the negative voltage. Thus, if any of the components including differential transformer 2, GFI detector circuit 16, circuit 21, power supply 18, SCR 24, solenoid 38, capacitor 40, and blocking diode 42 of circuit 102 fail, capacitor 40 does not discharge through solenoid 38, and the negative voltage across capacitor 40 from the collapsing field of solenoid 38 does not appear.

Checking circuit 100 is a stand-alone circuit preferably with its own power supply 44 providing power to a timer 52. Timer 52 is shown here as a 555 timer, but other timers known to those skilled in the art can be used. When the negative voltage appears across capacitor 40 and therefore across capacitor 36 as described above, a diode 46 conducts, pulling an input 50 of timer 52 LOW, triggering timer 52 into a monostable timeout mode. An output 53 of timer 52 goes HIGH, keeping a transistor 58 turned OFF. The timeout of timer 52 is long enough for timer 52 to be repeatedly re-triggered by the negative cycle discharge of capacitor 40 so that timer 52 does not time out. Thus, output 53 stays HIGH keeping transistor 58 OFF. An optional integrator formed by a resistor 54 and a capacitor 60 acts to hold transistor 58 OFF during any brief transitions when timer 52 times out just before timer 52 is re-triggered.

If GFI circuit 102 fails to discharge capacitor 40 to a negative voltage, then timer 52 is not re-triggered, causing output 53 to go LOW and turning transistor 58 ON. Turning transistor 58 ON preferably activates a fault lamp 64 thereby indicating a failure of GFCI circuit 102. Turning transistor 58 ON sends a signal through a differentiator 32 and blocking diode 26 to trigger SCR 24. Differentiator 32 sends a one-shot pulse to SCR 24 which lasts long enough to overlap into a positive AC cycle, so that triggering SCR 24 activates mouse trap device 73, trips contacts 74, and disables GFCI 10. Optional outcomes of a failure in GFCI 10 are locking out power, indicating the failure on a lamp, or both.

Figure 5:
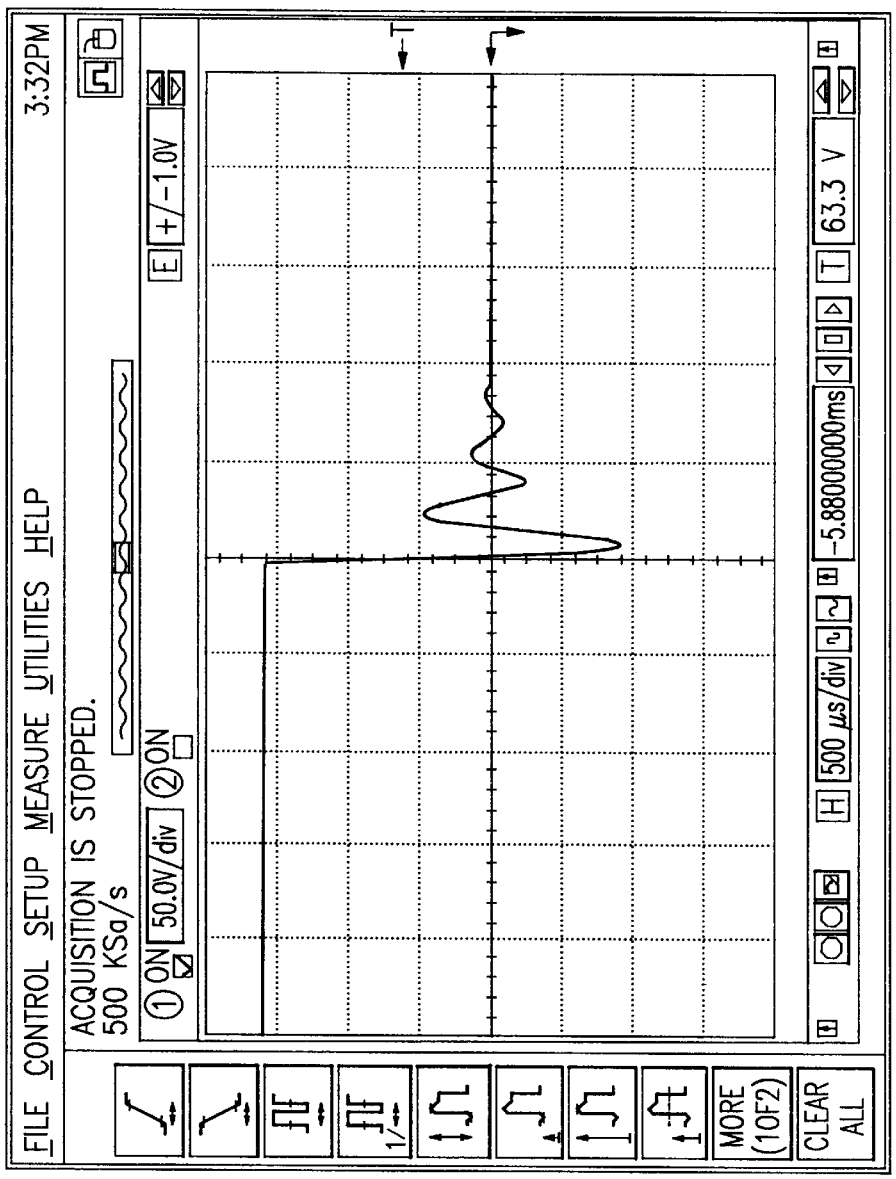
FIG. 5 shows a waveform for the circuit of FIG. 4.
Figure 4:
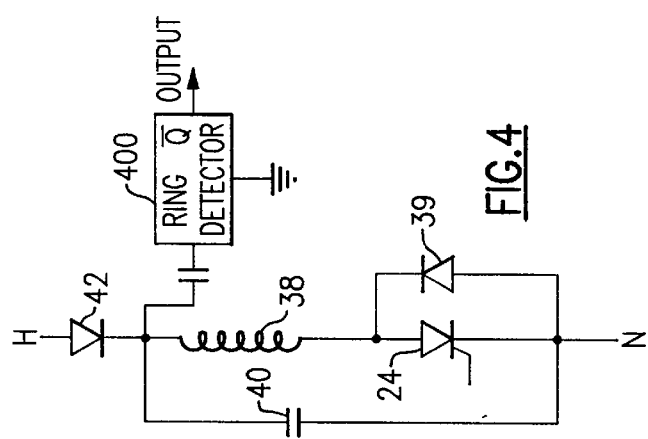
FIG. 4 shows an alternate circuit for detecting a ring signal across a capacitor according to an embodiment of the invention.

Referring to FIGS. 4–5, an embodiment is shown where an alternate circuit connection detects the ring signal across capacitor 40. A diode 39 replaces snubber 35 of the embodiment of FIG. 1 and the ring is detected across capacitor 40 instead of across snubber capacitor 36. Diode 39 provides a bypass of SCR 24 and allows the ring to continue as energy moves back and forth between solenoid 38 and capacitor 40. The voltage ring across capacitor 40 is shown in FIG. 5. A ring detector block 400 is essentially the same as checking circuit 100 of the embodiment of FIG. 1, where the absence of the ring causes timer 52 to time out indicating a circuit failure. Changes to checking circuit 100 to create ring detector block 400 are considered within the person skilled in the art.

Figure 7:
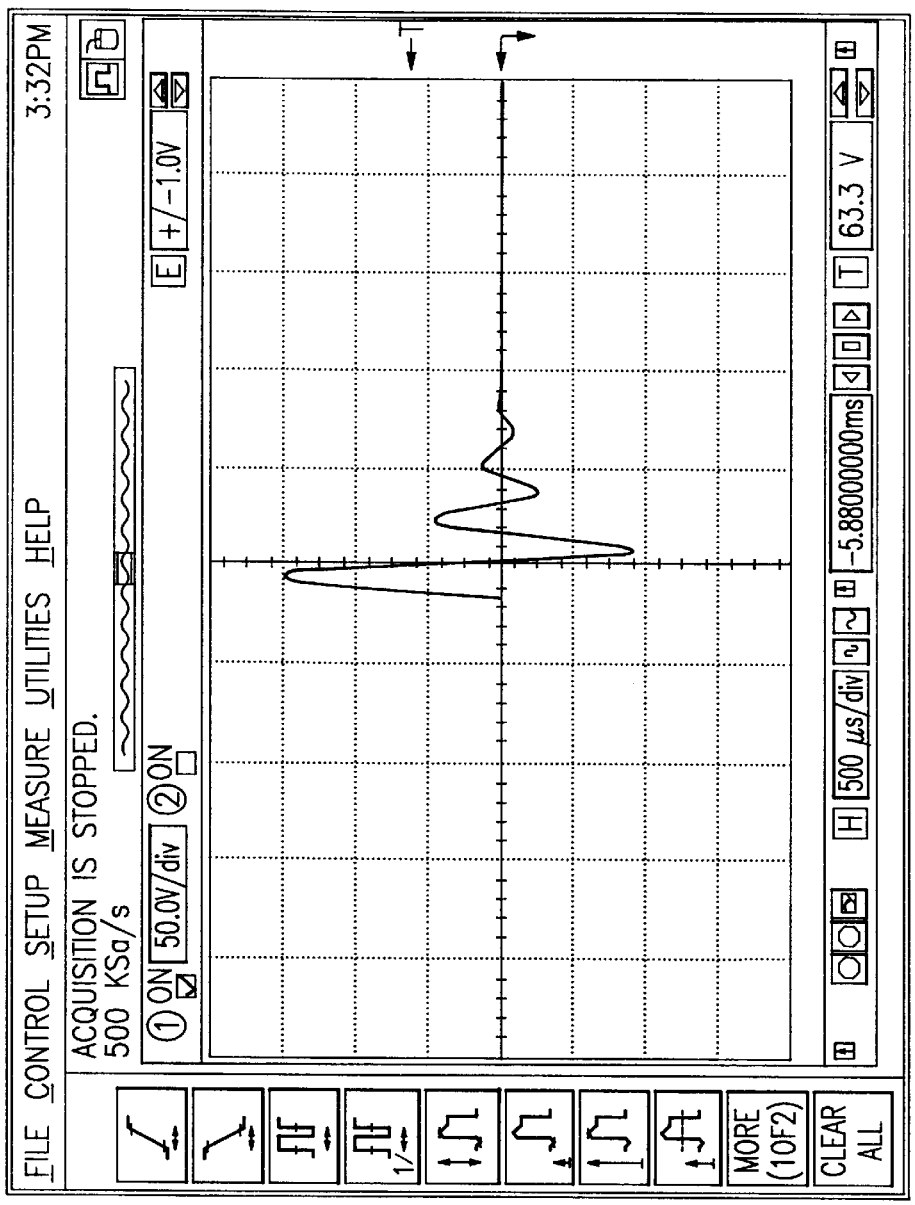
FIG. 7 shows a waveform for the circuit of FIG. 6.
Figure 6:
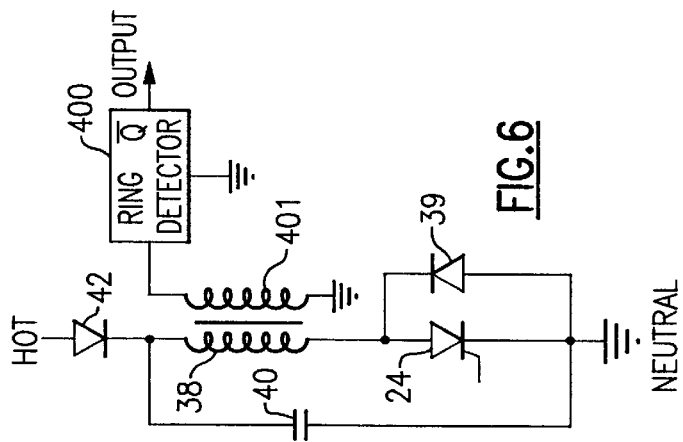
FIG. 6 shows an alternate circuit for detecting a ring signal across a capacitor according to an embodiment of the invention.

Referring to FIGS. 6–7, an embodiment similar to the embodiment of FIG. 4 is shown for obtaining the ring waveform. A secondary 401 intercepts the magnetic field from solenoid 38 and produces the waveform shown in FIG. 7. Block 400 detects the ring and issues an output if the ring fails due to circuit failure.

Figure 9:
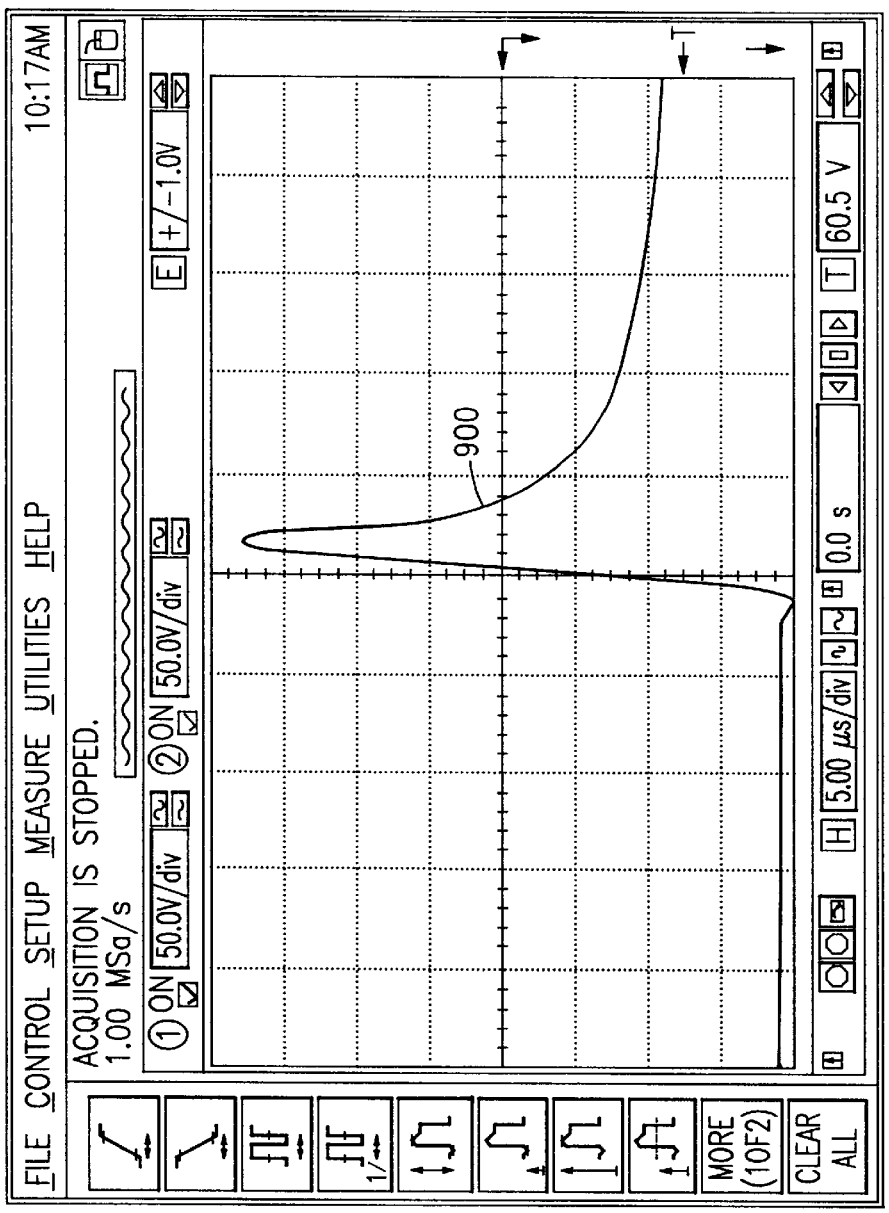
FIG. 9 shows a waveform for the circuit of FIG. 8.
Figure 8:
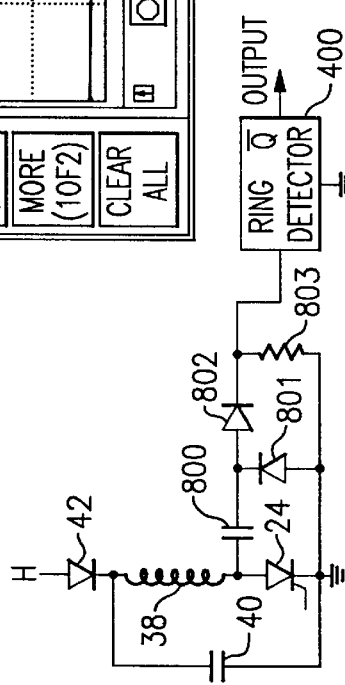
FIG. 8 shows an alternate circuit for detecting a ring signal across a capacitor according to an embodiment of the invention.

Referring to FIGS. 8–9, another embodiment is shown for obtaining the ringing waveform. A capacitor 800 is pump-charged by negative-going and positive-going ring voltage, causing a large output pulse of voltage across a resistor 803 indicative of ringing and a successful test. Capacitor 800 is first charged by the negative ring voltage causing a negative ring current to pass through a diode 801 and capacitor 800, followed by the next positive ring voltage pushing the previously stored negative ring charge in capacitor 800 along with the new charge from the positive ring through resistor 803, thereby producing a large positive pulse shown as 900 in FIG. 9. The pulse, indicative of ringing, is detected by a ring detector 400.

Figure 10:
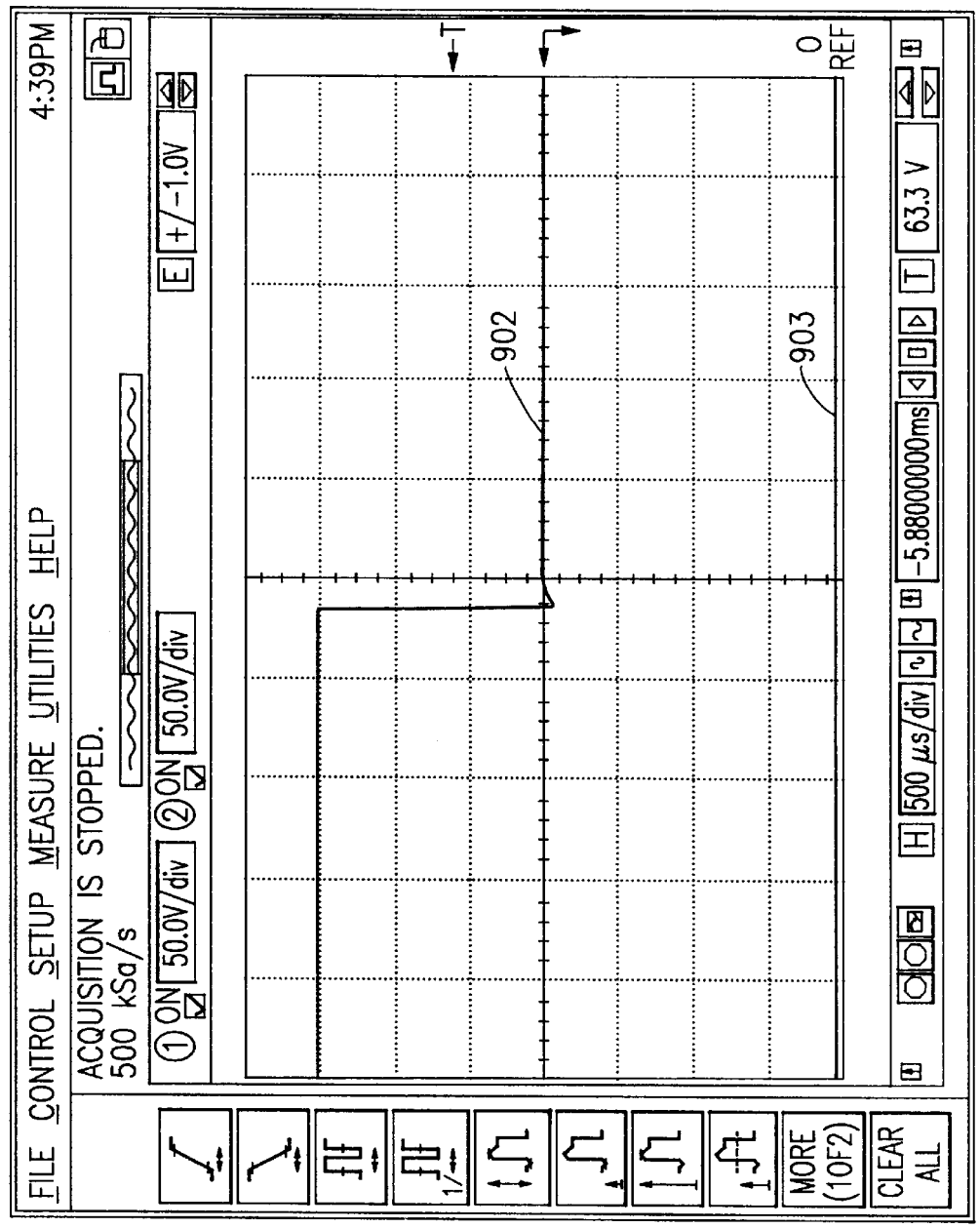
FIG. 10 shows a waveform for the circuit of FIG. 8 with a short.

Referring to FIG. 10, when solenoid 38 is shorted, indicating a failed solenoid, waveform 903 results. FIG. 10 is to the same scale as FIG. 9, showing how the pulse in FIG. 9 which is indicative of a successful test disappears when solenoid 38 is shorted.

It will be understood by those skilled in the art that although the circuits so far described perform a self test for correct circuit operation during the negative power cycle, i.e., when the SCR of the disclosed embodiments is inactive as far as carrying line current, the circuit reference and SCR orientation could be reversed so as to become non-conducting during the positive line cycle, at which time the ring test would be performed; and that the SCR switch could be replaced by another unipolar conducting device, such as a transistor or FET, placed in series with a blocking diode. In addition, the detector described herein could be used in a GFEP (ground fault equipment protector) or AFCI (arc fault interrupter circuit) as well as in a GFCI. Furthermore, although the GFCI is described herein as being connected to the hot and neutral lines, the present invention could be connected between any two lines, whether hot or neutral, by changing component values as appropriate.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A protection device connected between two lines of an AC power line, comprising:
    means for introducing a simulated ground fault current between said two lines during a first predetermined half-cycle of said AC power;
    detection means for detecting said introduced ground fault during said first predetermined half-cycle of said AC power; and
    response means, responsive to said detection means, for responding to an absence of detection of said introduced ground fault.

2. A protection device according to claim 1, wherein said detection means includes means for creating ringing and said detection means includes means for detecting an absence of said ringing.

3. A protection device according to claim 1, wherein said response means includes means for tripping said protection device during a second predetermined half-cycle of said AC power.

4. A protection device according to claim 3, wherein said response means includes means for indicating a fault exists within said protection device.

5. A protection device according to claim 4, wherein said response means includes means for preventing said protection device from being reset.

6. A protection device according to claim 1, wherein said response means includes means for indicating a fault exists within said protection device.

7. A protection device according to claim 1, wherein said response means includes means for preventing said protection device from being reset.

8. A protection device according to claim 1, wherein:
    said two lines are a hot line and a neutral line; and
    said means for introducing a ground fault includes a first predetermined half-cycle bypass connected between said hot and neutral lines.

9. A protection device according to claim 1, wherein said detection means includes:
    a capacitor placed across a series string consisting of a solenoid and a parallel combination of an SCR and a snubber circuit, wherein said capacitor charges on a second predetermined half cycle of said AC power;
    a blocking diode between said capacitor and said hot line; and
    a checking circuit connected to said snubber circuit, wherein said checking circuit produces an output which triggers said response means when said introduced ground fault is not properly detected by said detection means.

10. A protection device according to claim 9, wherein said checking circuit operates from a power supply independent from a remaining portion of said protection device.

11. A protection device according to claim 1, wherein said detection means includes:
    a capacitor placed across a series string consisting of a solenoid and a parallel combination of an SCR and a diode, wherein said capacitor charges on a second predetermined half cycle of said AC power;
    a blocking diode between said capacitor and said hot line; and
    a checking circuit connected to said capacitor, wherein said checking circuit produces an output which triggers said response means when said introduced ground fault is not properly detected by said detection means.

12. A protection device according to claim 11, wherein said checking circuit operates from a power supply independent from a remaining portion of said protection device.

13. A protection device according to claim 1, wherein said detection means includes;
    a capacitor placed across a series string consisting of a solenoid and a parallel combination of an SCR and a diode, wherein said capacitor charges on a second predetermined half cycle of said AC power;
    a blocking diode between said capacitor and said hot line; and
    a secondary transformer in operative cooperation with said solenoid;
    a checking circuit connected to said secondary transformer, wherein said checking circuit produces an output which triggers said response means when said introduced ground fault is not properly detected by said detection means.

14. A protection device according to claim 13, wherein said checking circuit operates from a power supply independent from a remaining portion of said protection device.

15. A protection device according to claim 1, wherein said detection means includes:
    a capacitor placed across a series string consisting of a solenoid and a parallel combination of an SCR and a resistor-capacitor-diode network;
    a blocking diode between said capacitor and said hot line; and
    a checking circuit connected to said network, wherein said checking circuit produces an output which triggers said response means when said introduced ground fault is not properly detected by said detection means.

16. A protection device according to claim 15, wherein said checking circuit operates from a power supply independent from a remaining portion of said protection device.

17. A protection device according to claim 1, wherein said protection device is one of a GFCI device, a GFEP device, and an AFCI device.

18. A self testing protection device connected between two lines of an AC power source, comprising:
    a resonant tank;
    a ground fault sensor,
    a rectified ground fault sensor bypass current sourced from a first polarity of said AC power source and used to energize said ground fault sensor;
    a first detector activated by said ground fault sensor, wherein said activated first detector causes said resonant tank to resonate, thereby indicating that all ground fault detection components in said device are operational; and a second detector, wherein said second detector responds to an absence of resonation in said resonant tank.

19. A protection device according to claim 18, wherein said resonant tank includes a trip solenoid, a switch, and a capacitor, wherein said switch conducts AC power line current through said trip solenoid only during said first polarity of said AC power source and a charge on said capacitor energizes said resonant tank during a second polarity of said AC power source.

20. A protection device according to claim 19, wherein said switch is one of a trip SCR and an electronic switch.

21. A protection device according to claim 19, wherein said second detector includes one of a snubber circuit, a diode, and a secondary.

22. A protection device according to claim 18, wherein said second detector includes one of a snubber circuit, a diode, and a secondary.

23. A protection device according to claim 18, wherein said second detector responds by tipping a solenoid.

24. A protection device according to claim 23, wherein said second detector responds by indicating a fault exists.

25. A protection device according to claim 24, wherein said second detector responds by preventing said protection device from being reset.

26. A protection device according to claim 18, wherein said second detector responds by indicating a fault exists.

27. A protection device according to claim 18, wherein said second detector responds by preventing said protection device from being reset.

28. A protection device according to claim 18, wherein said protection device is one of a GFCI device, a GFEP device, and an AFCI device.

29. A method for self-testing a protection device connected between two lines of an AC power line, comprising the steps of:

introducing a simulated ground fault between said lines during a first predetermined half cycle of said AC power;

detecting said introduced simulated ground fault during said first predetermined half cycle; and responding to an absence of detecting said introduced simulated ground fault.

* * * * *